(12) United States Patent
Babbitt

(10) Patent No.: US 11,614,020 B2
(45) Date of Patent: *Mar. 28, 2023

(54) FAN SPEED CONTROL ALGORITHM FOR ENGINE COOLING

(71) Applicant: Applied Industrial Technologies, Inc., Cleveland, OH (US)

(72) Inventor: Wenling Babbitt, San Diego, CA (US)

(73) Assignee: APPLIED INDUSTRIAL TECHNOLGIES, INC., Cleveland, OH (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/688,450

(22) Filed: Nov. 19, 2019

(65) Prior Publication Data

US 2020/0088087 A1   Mar. 19, 2020

Related U.S. Application Data

(63) Continuation of application No. 15/975,486, filed on May 9, 2018.

(60) Provisional application No. 62/561,831, filed on Sep. 22, 2017, provisional application No. 62/503,576, filed on May 9, 2017.

(51) Int. Cl.
    *F01P 7/04*      (2006.01)
    *F04D 29/58*     (2006.01)
    *F04D 27/00*     (2006.01)

(52) U.S. Cl.
    CPC .............. *F01P 7/044* (2013.01); *F01P 7/048* (2013.01); *F04D 27/004* (2013.01); *F04D 29/584* (2013.01); *F04D 29/5826* (2013.01); *F01P 2023/08* (2013.01); *F01P 2025/13* (2013.01); *F01P 2025/30* (2013.01); *F01P 2025/62* (2013.01)

(58) Field of Classification Search
    CPC .............. F01P 2023/08; F01P 2025/13; F01P 2025/30; F01P 2025/62; F01P 7/044; F01P 7/048; F04D 27/004; F04D 29/5826; F04D 29/584
    See application file for complete search history.

(56) References Cited

U.S. PATENT DOCUMENTS 6,311,488 B1 * 11/2001 Maruta ..................... F01P 3/02
                                                           60/450
2002/0124992 A1    9/2002 Rainer et al.
(Continued)

OTHER PUBLICATIONS

US Search Authority, International Search Report and Written Opinion for corresponding application No. PCT/US2018/031871 (dated Jul. 20, 2018).

*Primary Examiner* — Grant Moubry
*Assistant Examiner* — Ruben Picon-Feliciano
(74) *Attorney, Agent, or Firm* — Ulmer & Berne LLP; Brian E Turung

(57) ABSTRACT

A control system that uses an algorithm to control the fan speed in a cooling system for an engine is disclosed. The algorithm is adapted to maintain a cooling medium at a set temperature instead of an operating temperature range of the cooling medium. The algorithm is also adapted to maintain a cooling medium at a set temperature and to build a cooling safety margin in response to an engine output torque percentage that is below an output torque percentage setpoint.

8 Claims, 17 Drawing Sheets

(56) References Cited

U.S. PATENT DOCUMENTS

| | | | |
|---|---|---|---|
| 2008/0238607 A1* | 10/2008 | Schuricht | F01P 7/044 |
| | | | 340/3.1 |
| 2012/0260867 A1 | 10/2012 | Chadwick et al. | |
| 2014/0120820 A1* | 5/2014 | Glugla | F02B 29/0493 |
| | | | 454/75 |
| 2014/0244051 A1 | 8/2014 | Rollins et al. | |
| 2017/0022878 A1* | 1/2017 | Frick | A01D 34/80 |
| 2018/0045100 A1* | 2/2018 | Steinmetz | F02B 29/0456 |
| 2018/0251957 A1* | 9/2018 | Hyodo | E02F 9/2235 |
| 2018/0257454 A1* | 9/2018 | Brooks | B60H 1/00807 |

* cited by examiner

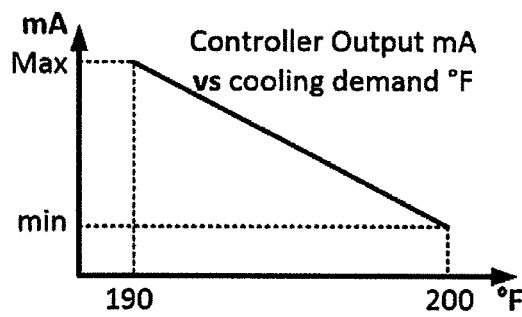
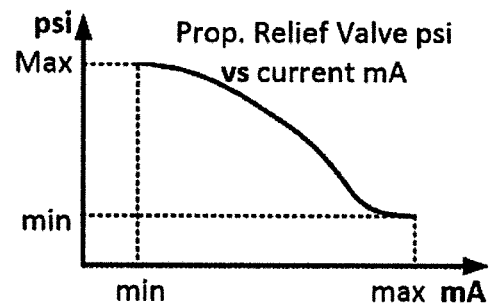
FIG. 2A  FIG. 2B
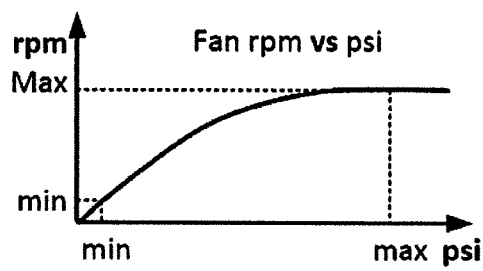
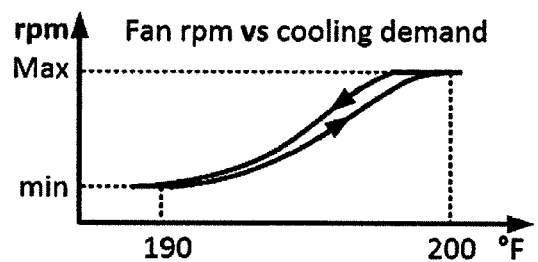
FIG. 2C  FIG. 2D

The highest cooling demand is 80%

FAN SPEED CONTROL ALGORITHM FOR ENGINE COOLING

CROSS REFERENCE TO RELATED APPLICATIONS

This application is a continuation of U.S. application Ser. No. 15/975,486 filed May 9, 2018, which in turn claims priority to U.S. Provisional Application Nos. 62/503,576, filed May 9, 2017, and 62/561,831, filed Sep. 22, 2017, the disclosures of which are herein incorporated by reference in their entirety.

BACKGROUND

The present disclosure relates to cooling systems, particularly to fan drive systems that include a pump for engine cooling, and more particularly to a control system that uses an algorithm to control fan drive systems and provide for improved cooling thereof.

Cooling systems are widely used in engines for any number of machines, including cars, trucks, heavy machinery, airplanes, etc. However, cooling systems implemented in such machines are known to suffer various drawbacks, including disproportionate use of engine power output, low efficiencies, high emissions, short life, loud noise from fan acceleration, etc.

It would be desirable to provide a novel control system that uses an algorithm to control known cooling systems and that addresses the disadvantages described above and others known in the art.

BRIEF DESCRIPTION

The present disclosure is directed to cooling systems such as fan drive systems that include a pump for engine cooling, and more particularly to a fan drive system that includes a pump for engine cooling wherein a control system that uses an algorithm to control the fan drive system and to provide for improved cooling is used.

One non-limiting aspect of the present disclosure is to use a control system that uses an algorithm to control the fan speed in a cooling system. The algorithm is adapted to maintain a cooling medium at a set temperature instead of an operating temperature range of the cooling medium. In some non-limiting embodiments, the set temperature is a temperature recommended by an OEM. In other non-limiting embodiments, the set temperature is a temperature determined within an operating range.

In another and/or alternative non-limiting aspect of the present disclosure, the control system further includes a fan drive system configured to implement the algorithm for maintaining the cooling medium at the set temperature. In some non-limiting embodiments, the fan drive system is hydraulic. In other non-limiting embodiments, the fan drive system is electric. For embodiments with hydraulic fan drive systems, the system can be a gear pump system, an open-circuit piston pump system, a closed-loop hydrostatic system, or a combination thereof. In addition, in non-limiting embodiments with hydraulic fan drive systems, a single or bi-directional fan can be included.

In another and/or alternative non-limiting aspect of the present disclosure, the fan drive system includes a microcontroller.

In another and/or alternative non-limiting aspect of the present disclosure, a control system is included which is adapted to control the fan drive system and to maintain the cooling medium at the set temperature.

In another and/or alternative non-limiting aspect of the present disclosure, a control system that uses an algorithm to control the fan speed, which algorithm is adapted to maintain a cooling medium at a set temperature and to build a cooling safety margin in response to an engine output torque percentage that is below an output torque percentage setpoint. A controller is included and is adapted to predict an engine torque demand increase. The controller can be a microcontroller. In some non-limiting embodiments, the cooling safety margin is adapted to spare a percentage of horsepower required for working from a percentage of horsepower required for cooling the cooling medium in response to the controller predicting the engine torque demand increase. In some additional non-limiting embodiments, the percentage of horsepower required for working and spared from the percentage of horsepower required for cooling is about 80%. In other non-limiting embodiments, the predicted engine torque demand increase is based on the engine output torque percentage that is above the output torque percentage setpoint.

In another and/or alternative non-limiting aspect of the present disclosure, the engine torque demand increase is determined from a skid-steer loader machine. Furthermore, the set temperature can be an operating temperature range recommended by an OEM. In some non-limiting embodiments, a fan drive system is included and is configured to implement the algorithm for maintaining the cooling medium at the set temperature and building the cooling safety margin. In some non-limiting embodiments, the fan drive system includes a hydraulic fan drive system, an electric fan drive system, a variable viscous clutch fan drive system, or a combination thereof. In non-limiting embodiments where the fan drive system is hydraulic, the fan drive system can be a gear pump system, an open-circuit piston pump system, a closed-loop hydrostatic system, and combinations thereof. In other non-limiting embodiments where the fan drive system is hydraulic, the fan drive system includes a single or bi-directional fan.

In another and/or alternative non-limiting aspect of the present disclosure, there is provided a cooling system for an engine. The cooling system includes a pump driven by the engine and fluidly coupled to a motor-driven fan. The motor-driven fan is adapted to cool a cooling medium and maintain the cooling medium at a setpoint temperature range. The cooling system also includes a controller for controlling a speed of the motor-driven fan. The controller is further configured to increase the speed of the motor-driven fan in response to low cooling demand by the engine, and the increase in fan speed is configured to maintain the cooling medium at a minimum setpoint temperature which corresponds to an engine output that is below a threshold value. The controller is further configured to decrease the speed of the motor-driven fan in response to high cooling demand by the engine. The decrease in fan speed corresponds to an engine output that is above the threshold value and occurs until the cooling medium reaches a maximum setpoint temperature. The engine output referred to is torque, and the torque not used by the fan pump is available for use by other working systems driven by the engine.

One non-limiting object of the present invention is the provision of a control system that uses an algorithm to control the fan speed, which algorithm is adapted to maintain a cooling medium at a set temperature instead of an operating temperature range of the cooling medium.

Another and/or alternative non-limiting object of the present invention is the provision that the set temperature is a temperature recommended by an OEM or a temperature determined within an operating range.

Another and/or alternative non-limiting object of the present invention is the provision of a fan drive system configured to implement the algorithm for maintaining the cooling medium at the set temperature.

Another and/or alternative non-limiting object of the present invention is the provision that the fan drive system is hydraulic or electric.

Another and/or alternative non-limiting object of the present invention is the provision that the fan drive system is hydraulic and includes a gear pump system, an open-circuit piston pump system, a closed-loop hydrostatic system, or a combination thereof.

Another and/or alternative non-limiting object of the present invention is the provision that the fan drive system is hydraulic and includes either a single or bi-directional fan.

Another and/or alternative non-limiting object of the present invention is the provision that the fan drive system comprises a microcontroller.

Another and/or alternative non-limiting object of the present invention is the provision of maintaining the cooling medium at the set temperature.

Another and/or alternative non-limiting object of the present invention is the provision of a control system that uses an algorithm to control the fan speed, which algorithm is adapted to maintain a cooling medium at a set temperature and to build a cooling safety margin in response to an engine output torque percentage that is below an output torque percentage setpoint; and, a controller adapted to predict an engine torque demand increase.

Another and/or alternative non-limiting object of the present invention is the provision that the cooling safety margin is adapted to spare a percentage of horsepower required for working from a percentage of horsepower required for cooling the cooling medium in response to the controller predicting the engine torque demand increase.

Another and/or alternative non-limiting object of the present invention is the provision that the percentage of horsepower required for working and spared from the percentage of horsepower required for cooling is about 80%.

Another and/or alternative non-limiting object of the present invention is the provision that the predicted engine torque demand increase is based on the engine output torque percentage that is above the output torque percentage setpoint.

Another and/or alternative non-limiting object of the present invention is the provision that the engine torque demand increase is determined from a skid-steer loader machine.

Another and/or alternative non-limiting object of the present invention is the provision that the set temperature is an operating temperature range recommended by an OEM.

Another and/or alternative non-limiting object of the present invention is the provision of a fan drive system configured to implement the algorithm for maintaining the cooling medium at the set temperature and building the cooling safety margin.

Another and/or alternative non-limiting object of the present invention is the provision that the fan drive system includes a hydraulic fan drive system, an electric fan drive system, a variable viscous clutch fan drive system, or a combination thereof.

Another and/or alternative non-limiting object of the present invention is the provision that the fan drive system is hydraulic and includes a gear pump system, an open-circuit piston pump system, a closed-loop hydrostatic system, and combinations thereof.

Another and/or alternative non-limiting object of the present invention is the provision that the fan drive system is hydraulic and includes a single or bi-directional fan.

Another and/or alternative non-limiting object of the present invention is the provision that the controller is adapted to predict the engine torque demand increase is a microcontroller.

Another and/or alternative non-limiting object of the present invention is the provision of a cooling system in an engine, comprising a pump driven by the engine and fluidly coupled to a motor-driven fan, the motor-drive fan adapted to cool a cooling medium and maintain the cooling medium at a setpoint temperature range; and, a controller for controlling a speed of the motor-driven fan, wherein the controller is configured to increase the speed of the motor-driven fan in response to low cooling demand by the engine, the increase in fan speed configured to maintain the cooling medium at a minimum setpoint temperature and corresponding to an engine output that is below a threshold value and, wherein the controller is configured to decrease the speed of the motor-driven fan in response to high cooling demand by the engine, the decrease in fan speed corresponding to an engine output that is above the threshold value and occurring until the cooling medium reaches a maximum setpoint temperature, and, wherein the engine output is torque and the torque not used by the fan pump is available for use by other working systems driven by the engine.

These and other objects and advantages will become apparent from the discussion of the distinction between the disclosure and the prior art and when considering the preferred embodiment shown in the accompanying drawings.

BRIEF DESCRIPTION OF THE DRAWINGS

Reference may now be made to the drawings, which illustrate various embodiments that the disclosure may take in physical form and in certain parts and arrangement of parts wherein:

Reference may now be made to the drawings, which illustrate various embodiments that the disclosure may take in physical form and in certain parts and arrangement of parts wherein:

FIGS. 2A-2D are exemplary illustrations showing operating parameter charts of known hydraulically-driven fan speed control parameters for engine cooling;

DETAILED DESCRIPTION OF NON-LIMITING EMBODIMENTS

Figure 1:
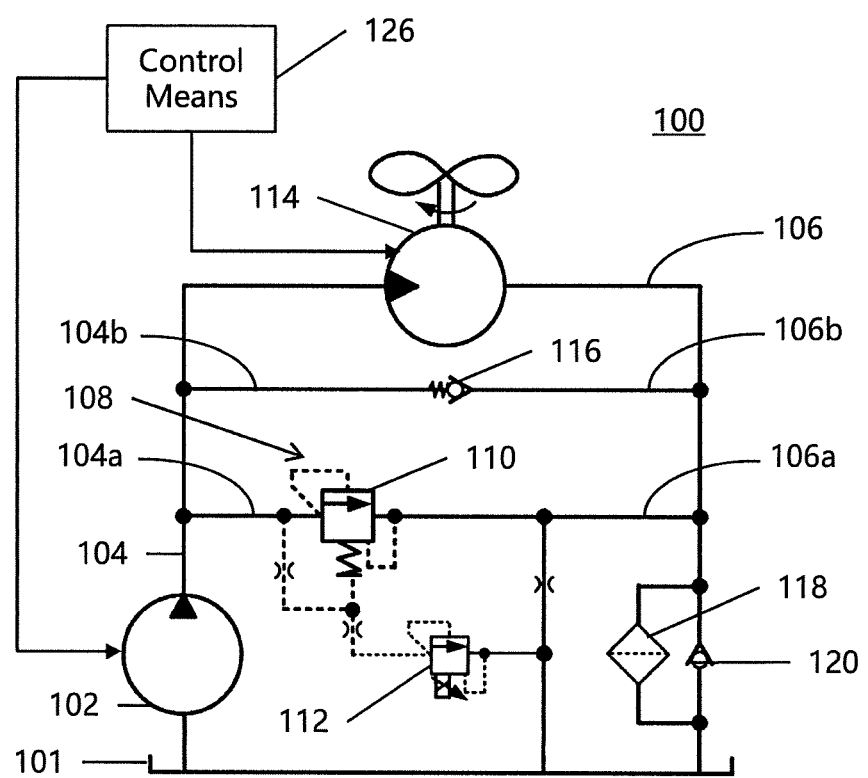
FIG. 1 is an illustration according to one non-limiting embodiment of the present disclosure showing an exemplary illustration of a known hydraulic fan drive system for a single-directional fan.

Referring now to FIG. 1, there is illustrated a typical hydraulic fan drive system 100 for cooling an engine (not shown). The hydraulic fan drive system can be composed of any desired drive system including, but not limited to, one of a gear pump system, an open-circuit piston pump system, a closed-loop hydrostatic system, or a combination thereof. As illustrated in FIG. 1, the system 100 includes a fixed displacement hydraulic pump 102 and a supply tank 101 containing a cooling fluid (e.g., oil). The fixed displacement hydraulic pump 102 is adapted to draw the fluid from tank 101 and direct the fluid to a fan motor 114 via supply line 104. Supply line 104 further includes valve supply line 104a, which provides fluid to pressure controlling valve system 108, and valve supply line 104b, which provides fluid to directional spring-controlled check valve 116. Fan exhaust line 106 and valve exhaust lines 106a, 106b are configured to redirect fluid to tank 101. The exhausted fluid can be first directed to one or more optional components before reaching tank 101, such as a filter 118 and associated directional check valve 120. While system 100 of FIG. 1 is illustrated as having only one (1) fan 114, it should be understood that more than one fan could be included in the system without departing from the scope of the present disclosure. For example, a bank of fans could be included, the particular number of which is non-limiting. The system 100 is further illustrated as including a control means 126, such as a microcontroller, for controlling the operations of the fan 114 and/or the pump 102

The pressure controlling valve system 108 can be composed of one or more pressure relief valves, such as spring-operated pressure relief valve 110 and electrically operated, proportional pressure relief valve 112. The pressure controlling valve system 108, including spring-operated pressure relief valve 110 and proportional pressure relief valve 112, is controlled by the cooling demand of the engine. More particularly, based on the amount of oil bypassing the fan motor 114, the pressure controlling valve system 108 is adapted to control the amount of the fixed flow directed to the fan motor 114 from the fixed displacement hydraulic pump 102.

FIGS. 2A-2D illustrate typical fan speed control parameters for engine cooling which can be used to control the operation of fan drive system 100 when the fan is controlled hydraulically. FIG. 2A is a chart showing the fan controller output (in milliamps, "mA") vs. the cooling demand (in degrees Fahrenheit). FIG. 2B is a chart showing the pressure (in pounds per square inch, "psi") of the one or more proportional relief valves vs. the current (in mA) across the fan's electronic circuit. FIG. 2C is a chart showing the fan speed (in revolutions per minute, "rpm") vs. the pressure (in psi) in the one or more proportional relief valves. FIG. 2D is a chart showing the fan speed (in rpm) vs. the cooling demand (in degrees Fahrenheit).

In each illustration of FIGS. 2A-2D, the hydraulically-operated fan 114 starts to rotate at a minimum speed when the engine coolant temperature reaches about 190° F. The fan 114 is adapted to reach a maximum speed at about 200° F. The highest cooling demand among the cooling media (such as engine coolant, charge air, transmission oil, hydraulic oil, etc.) determines the speed of fan 114. The type of fan 114 required to meet the cooling demand in a particular system is typically chosen based on the fan's ability to sufficiently cool the engine at the worst or most demanding conditions (i.e., the highest cooling demand of the particular cooling media).

Figure 3A:
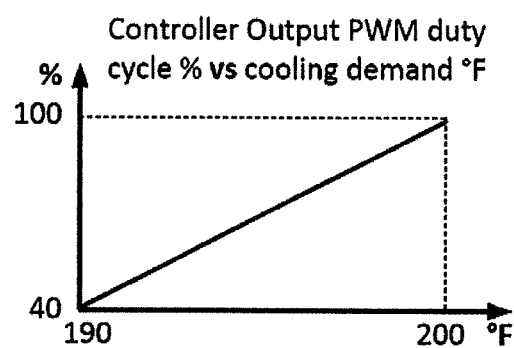
FIGS. 3A-3D are exemplary illustrations showing operating parameter charts of known electrically-driven fan speed control parameters for engine cooling.
Figure 3B:
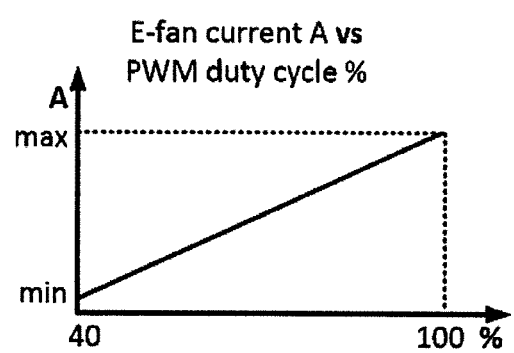
Figure 3C:
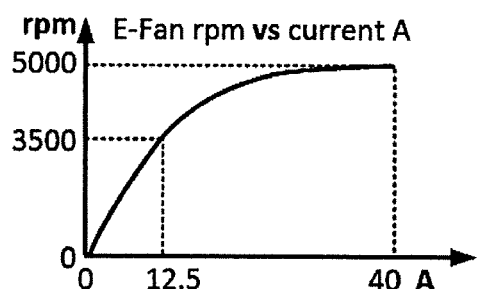
Figure 3D:
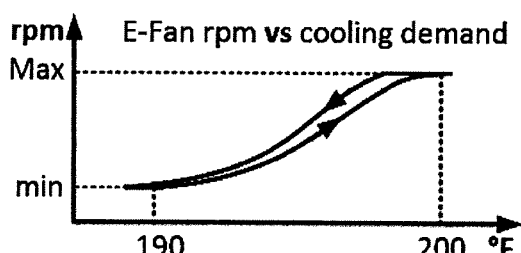

FIGS. 3A-3D illustrate typical fan speed control parameters for engine cooling which can be used to control the operation of the fan drive system 100 when the fan 114 is controlled electronically (i.e., when the fan 114 is an "e-fan"). FIG. 3A is a chart showing the fan controller's output of pulse-width modulation ("PWM") duty as a percentage vs. the cooling demand (in degrees Fahrenheit). FIG. 3B is a chart showing the current (in amps, "A") vs. the fan controller's output of PWM duty as a percentage. FIG. 3C is a chart showing e-fan speed in RPM vs. the current (in A) across the fan's electronic circuit. FIG. 3D is a chart showing the e-fan's speed (in rpm) vs. the cooling demand (in degrees Fahrenheit).

In each illustration of FIGS. 3A-3D, the fan 114 starts to rotate at minimum speed when the engine coolant temperature reaches about 190° F. The fan 114 is adapted to reach a maximum speed at about 200° F. The speed of the e-fan (or the speed of each e-fan in a bank of fans) is determined by the cooling demand of the cooling medium. Again, the type of fan 114 required to meet the cooling demand in the e-fan system is chosen based on the fan's ability to sufficiently cool the engine at the worst or most demanding conditions (i.e., the highest cooling demand of the particular cooling media).

Figure 4:
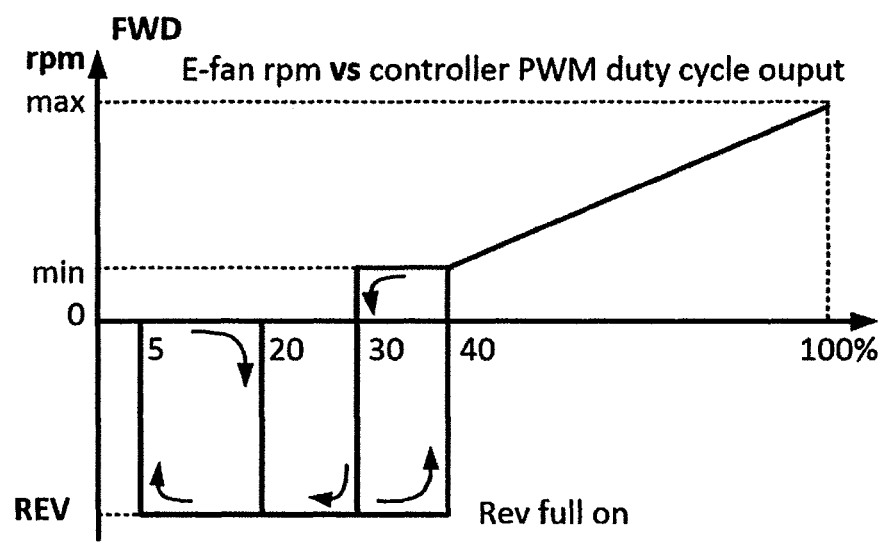
FIG. 4 is an exemplary illustration showing a chart of e-fan speed vs. PWM duty cycle performance curve for of a known e-fan.

FIG. 4 illustrates a typical e-fan speed in rpm vs. PWM duty cycle as a percentage. The speed of the e-fan in the forward direction is proportional to the PWM duty cycle from 40% to 100%. Below 40% is the full speed of the e-fan in the reverse direction. Different e-fan manufacturers have different PWM duty cycles for full reverse speed. As shown in the chart of FIG. 4, hysteresis exists for any e-fans.

Figure 5:
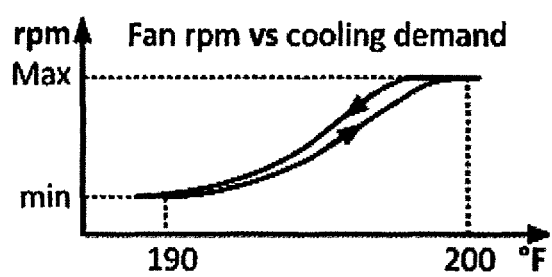
FIG. 5 is an exemplary illustration showing a chart of fan speed vs. cooling demand for engine cooling for a known drive system, wherein the control parameter applies to both single- and bi-directional fan drive systems.

Turning now to FIG. 5, a chart is shown which illustrates fan speed in rpm vs. cooling demand for hydraulically- and electrically-driven fans. The chart in FIG. 5 is representative of prior art control parameters which dictate the operation of existing fan drive systems. In view of these aforementioned prior art control parameters, there is a need for a new control system fan speed vs. cooling demand for hydraulically- and electrically-driven fans.

The control means 126 can be a microprocessor base control, as is known in the art, which utilizes programming logic for computing and decision-making processes. The program can be stored in a memory component as known in the art. One embodiment of the present exemplary algorithm, important to the function of the control means 126, is shown in the flow chart of FIG. 6A. The exemplary control fan algorithm can be used to control any suitable fan drive system, such as those illustrated in FIGS. 1 and 8A-8B. The algorithm starts at 300, and the controller determines the optimum setpoint temperature Ts for a given coolant at 302. Next, at 304, the controller checks the actual temperature Tc of the coolant in the system. At 306, the controller checks whether the coolant temperature Tc is greater than the setpoint temperature Ts. If yes, the algorithm moves on to 310, where the controller increases the fan speed to its maximum speed. If no, the algorithm moves on to 308 where the controller maintains the fan at a nominal speed. After increasing the fan to maximum speed in 310, the controller again checks the coolant temperature Tc at 312. At 314, if the coolant temperature Tc is greater than the setpoint temperature Ts, then the controller at 318 continues to maintain the fan at maximum speed. If the coolant temperature Tc is not greater than the setpoint temperature Ts at 314, then the controller moves on to 316 and decreases the fan to the nominal speed. Finally, at 320, the algorithm directs the controller to return to start.

Figure 6B:
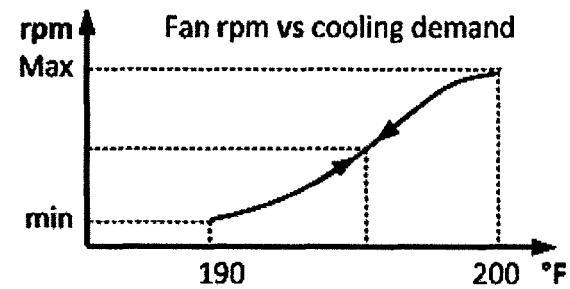
FIG. 6B is an exemplary illustration showing a chart of fan speed vs. cooling demand in accordance with the algorithm of the present disclosure, wherein the control algorithm applies to both single- and bi-directional fan drive systems.
Figure 6A:
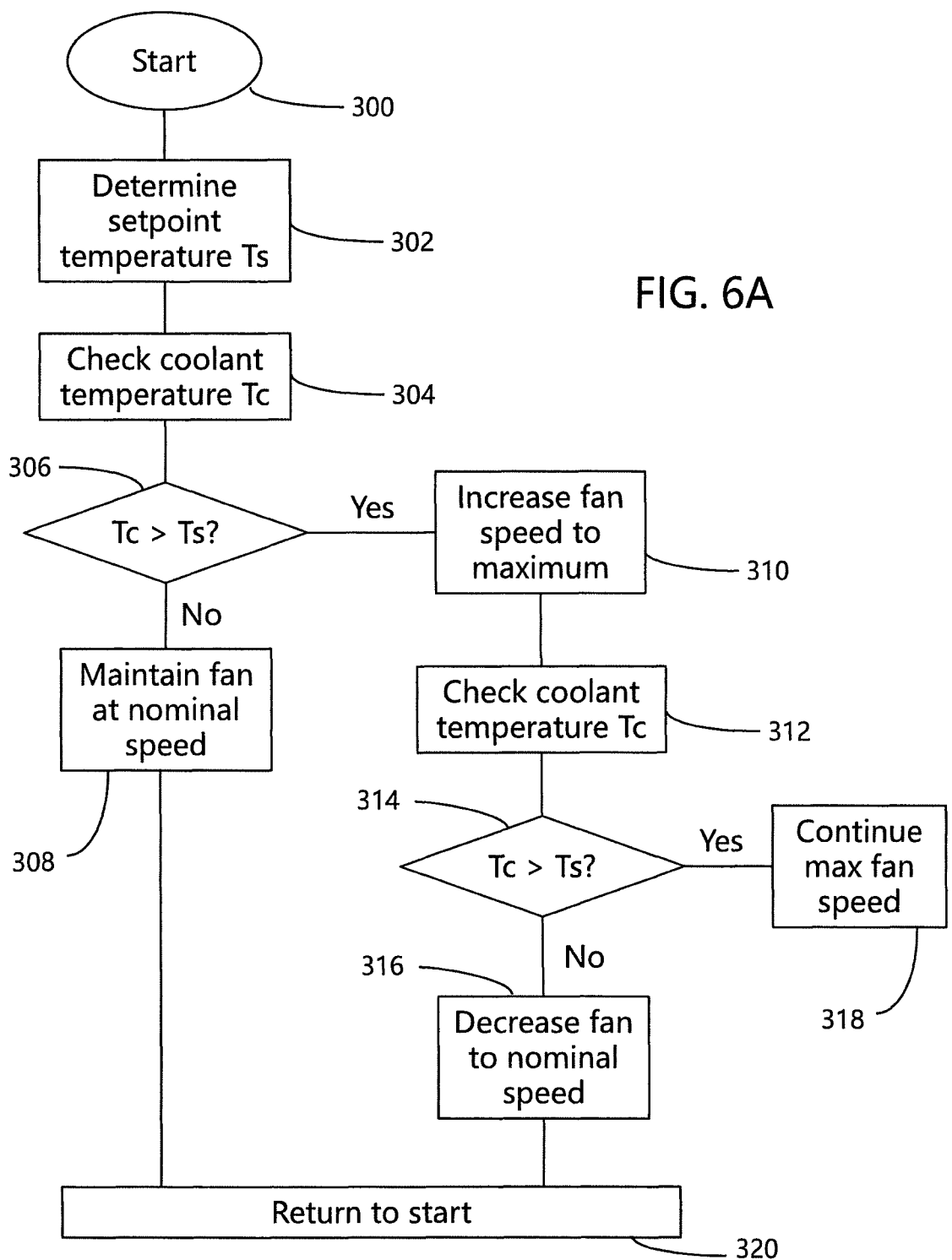
FIG. 6A is an illustration showing a flowchart of an algorithm adapted to control a drive system in accordance with one aspect of the present disclosure.

FIG. 6B illustrates an exemplary embodiment of a control fan algorithm according to the present disclosure and as discussed above with respect to the flowchart of FIG. 6A. The exemplary control algorithm is adapted to maintain the cooling media at a certain temperature and to provide a cooling safety margin from a given setpoint temperature up to an upper operating temperature limit for the coolant (e.g., about 200° F.). The setpoint temperature can be defined as a temperature recommended by a particular engine manufacturer or can be defined as any temperature point within a suitable operating range for a given cooling media as determined by a user/customer.

For example, and as shown in FIG. 6B, the setpoint temperature can be about 195° F. The chart in FIG. 6B illustrates that fan speed, as controlled by an electronic controller (such as control means 126), is adjusted according to the demand of the system in order to maintain the engine coolant at the optimum setpoint temperature (e.g., 195° F.). When the engine coolant temperature rises, the fan speed increases to lower the coolant temperature to the optimum setpoint temperature (e.g., 195° F.). The fan speed increases until the fan reaches its maximum speed. When the engine coolant temperature decreases, the fan speed decreases to lower the coolant temperature to the optimum setpoint temperature (e.g., 195° F.). The fan speed decreases until the fan reaches its minimum speed. When controlled by this exemplary algorithm, the energy consumed by the fan is proportional to the speed of the fan cubed.

To further illustrate the exemplary fan control algorithm of the present disclosure, a fan having 30 horsepower ("HP"), a maximum fan speed of 2500 rpm for an engine coolant having an upper operating limit of 200° F., and a minimum fan speed of 500 rpm for an engine coolant having a lower operating limit of 190° F., is assumed. In known fan control parameters, such as the one illustrated in FIG. 5, the actual fan speed in this example is determined by the engine coolant temperature. In contrast, in the exemplary control algorithm illustrated in FIG. 6B of the present disclosure, the fan as described above runs at a nominal speed of 1500 rpm and the engine coolant temperature is maintained at about 195° F. for substantially all of the duration that the fan is running.

Continuing with the above fan specification example, for an engine that uses such a fan, the engine generally reaches its peak torque and horsepower usage when the associated machine is performing a work-intensive task, such as climbing a hill. The fan drive system will compete for horsepower during the work-intensive task with other systems, such as the propulsion system for moving the machine. With the prior art control parameters discussed above and shown in FIGS. 2A-5, the fan will run at its maximum speed of 2500 rpm and require its maximum power of 30 HP. In contrast, with the control algorithm of the present disclosure shown in FIG. 6B, the fan can remain at a nominal speed of about 1500 rpm for a comparatively short duration of time, until the engine coolant temperature reaches 200° F.

Figure 7:
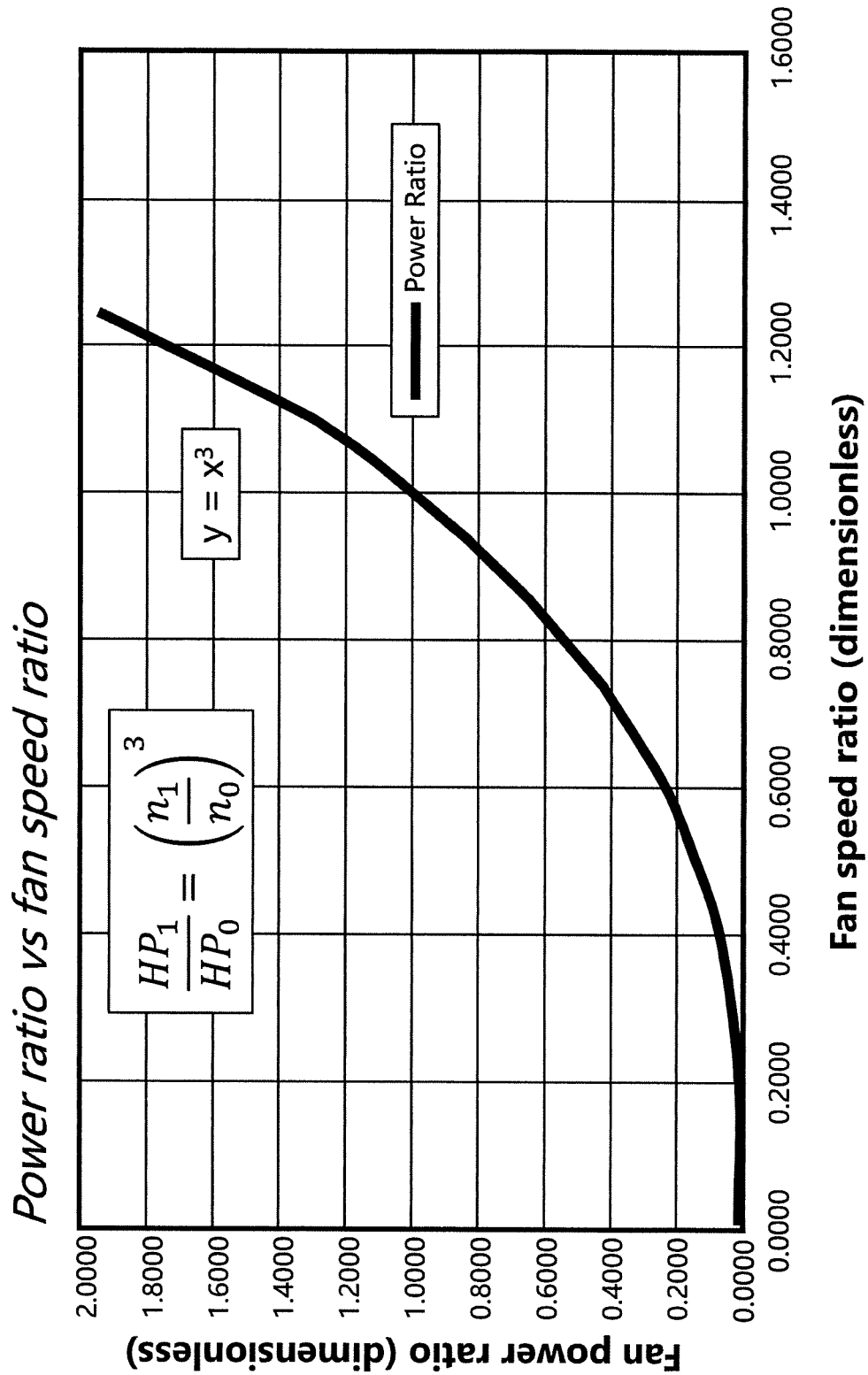
FIG. 7 is an exemplary illustration showing a graphs of fan horsepower vs. fan speed in accordance with the algorithm of the present disclosure.

As illustrated in the chart of FIG. 7, which shows fan horsepower ratio vs. fan speed ratio for a fan using the exemplary control algorithm of the present disclosure, the fan requires its maximum power of 30 HP at the maximum speed of 2500 rpm, but only requires about 6.5 HP at a speed of about 1500 rpm. Accordingly, the presently described control algorithm will allow the fan drive system to spare about 23.5 HP during at least a few intervals of time during which the other machine systems that may be utilized for the work intensive task can use the spare power. Moreover, by maintaining the setpoint or optimum temperature (e.g., 195° F.) for most of the duration at which the engine is run, the engine will exhibit higher efficiency, lower emissions, and longer life. In addition, because the fan speed is generally maintained at a speed of about 1500 rpm for most of the duration at which the engine is run, any change in speed occurs more gradually, resulting in lower noise due to fan acceleration, less wear and tear on the fan and fan motor, and longer work life for the fan and fan motor.

Figure 8A:
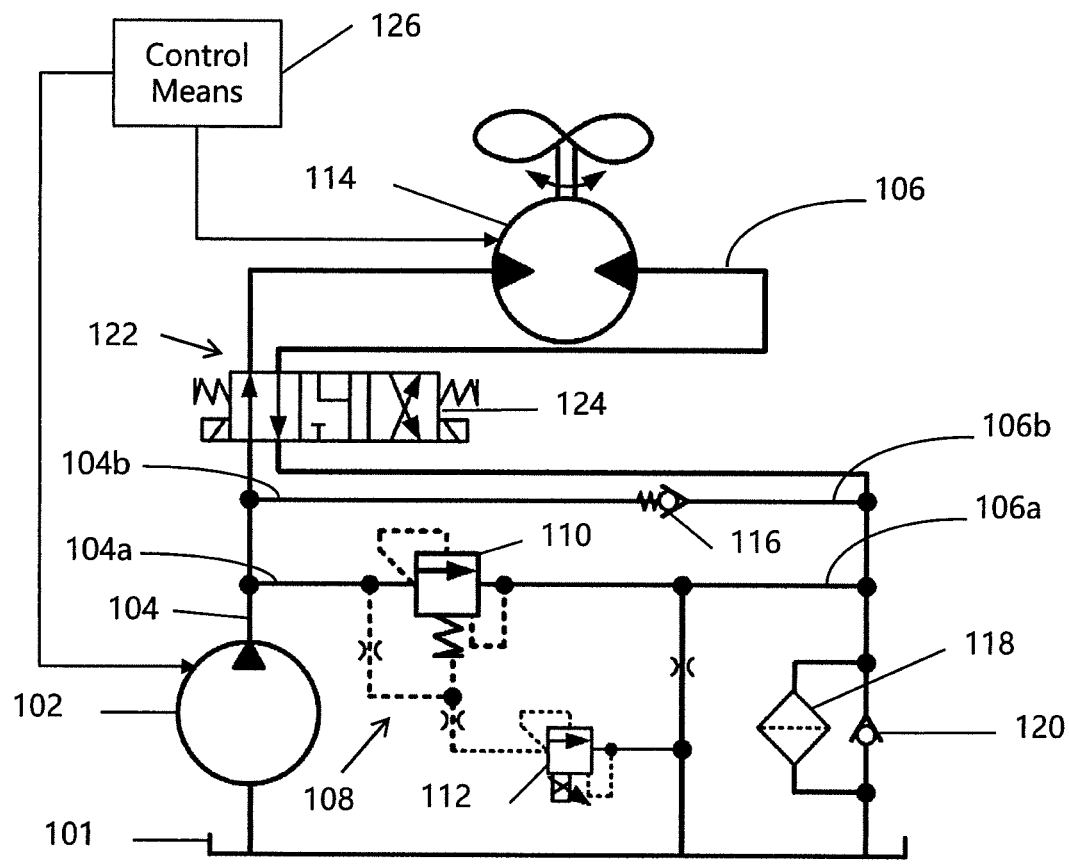
FIG. 8A is an illustration according to one non-limiting embodiment of the present disclosure showing an exemplary hydraulic fan drive system with a fixed pump.
Figure 8B:
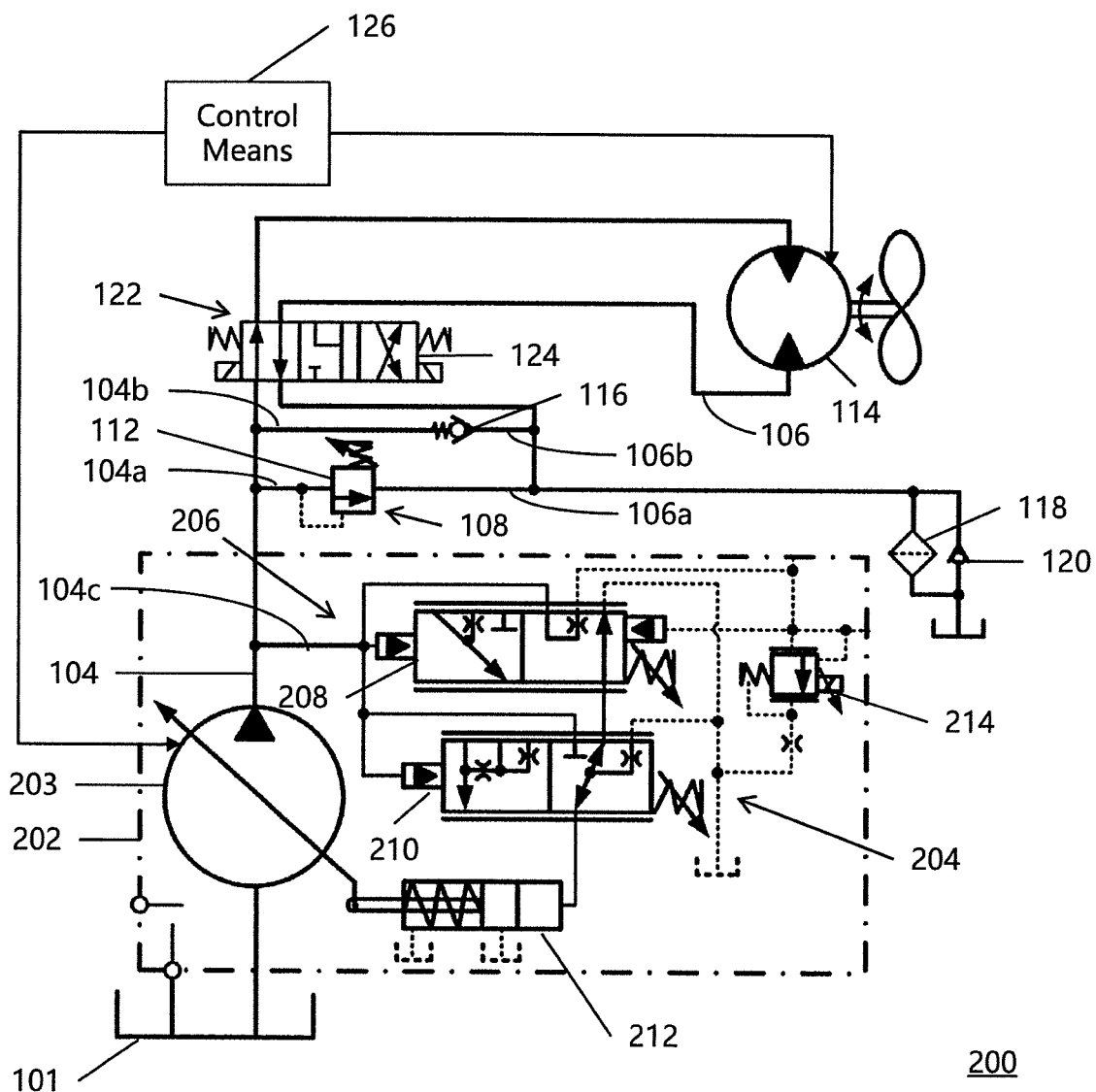
FIG. 8B is an illustration according to another non-limiting embodiment of the present disclosure showing an exemplary hydraulic fan drive system with a variable pump.

The systems illustrated in FIGS. 8A-8B are similar to the system illustrated in FIG. 1, and identical reference indicators are used to indicate the same/similar components where applicable. FIG. 8A illustrates another embodiment of the fixed hydraulic pump system 100 from FIG. 1, and FIG. 8B illustrates an additional embodiment which uses a variable pump 203 instead of a fixed pump. The systems of FIGS. 8A and 8B are particularly suited to an engine used in a machine such as a skid-steer loader or any other small, rigid-frame, engine-powered machine with lift arms used to attach a wide variety of labor-saving tools or attachments.

Identical components between all three systems illustrated in FIG. 1 and FIGS. 8A-8B include but are not limited to pump 102, supply tank 101, one or more supply lines 104 and one or more corresponding exhaust lines 106, pressure controlling valve system 108 including spring-operated pressure relief valve 110 and electrically operated proportional pressure relief valve 112, fan 114, directional spring-controlled check valve 116, filter 118, and check valve 120. Ways in which the systems illustrated in FIGS. 8A and 8B differ from the system in FIG. 1 includes, but is not limited to, the fan 114 being adapted to operate in reverse. That is, in FIG. 1, the fan 114 is single-directional and is illustrated with an arrow indicating operation in the clockwise direction. In FIGS. 8A and 8B, the fan 114 is bi-directional and is illustrated with an arrow indicating operation in both the clockwise and counterclockwise direction. Moreover, the fan drive system illustrated in FIGS. 8A and 8B can include any desired drive system including, but not limited to, a hydraulic fan drive system, an electric fan drive system, a variable viscous clutch fan drive system, or a combination thereof.

The reverse fan capability illustrated in FIGS. 8A and 8B is achieved through use of a reversing valve 122. The reversing valve 122 illustrated in FIGS. 8A and 8B includes a 3-position on/off reversing valve 124. However, the specific type of reversing valve used in the hydraulic fan drive system is non-limiting and can include any 2-position or 3-position on/off valve known in the art. The pressure controlling valve system 108, including spring-operated pressure relief valve 110 and proportional pressure relief valve 112, is controlled by the cooling demand of the engine. More particularly, based on the amount of oil bypassing the fan motor 114, the pressure controlling valve system 108 is adapted to control the amount of the fixed flow directed to the fan motor 114 from the fixed displacement hydraulic pump 102 in FIG. 8A and from the variable hydraulic pump 203 in FIG. 8B. Moreover, both systems in FIGS. 8A and 8B are configured to be schematically arranged with inverted logic for fail-safe purposes.

Referring now to FIG. 8B, an embodiment of a hydraulic fan drive system 200 for cooling an engine is illustrated. However, hydraulic fan drive system 200 is configured to include a variable pump system 202 with variable pump 203. The variable pump 203, like the fixed pump systems illustrated in FIGS. 1 and 8A, is adapted to draw fluid from tank 101 and direct the fluid to fan motor 114 via supply line 104. Supply line 104 in system 200 also similarly includes valve supply line 104a to provide fluid to pressure controlling valve system 108 and proportional relief valve 112, and valve supply line 104b to provide fluid to directional spring controlled check valve 116. Fan exhaust line 106 and valve exhaust lines 106a, 106b are similarly configured to redirect fluid to tank 101 or optionally to filter 118 and associated directional check valve 120 before reaching the tank.

However, different from the fixed pump systems in FIGS. 1 and 8A, the variable pump system 202 includes an additional supply line 104c adapted to direct fluid from the variable pump 203 to a directional control system 204. The directional control system 204 is illustrated in FIG. 2 as including at least four directional control components; however, this number is non-limiting and any desired number of directional components can be included without departing from the scope of the present disclosure. One of the directional control components in control system 204 is a directional control valve system 206, which includes a first directional control valve 208 and a second directional control valve 210. Both control valves 208, 210 are illustrated as being hydraulically-operated, 2-position directional valves. The directional valve system 206 is configured to control the variable pump 203 via actuator/cylinder 212. The cylinder 212 is illustrated as a single-acting type which achieves its return stroke through use of a spring. Finally, the variable pump system 202 includes a proportional relief valve 214. The relief valve 214 is illustrated as being a spring-centered, electrically-operated proportional relief valve having infinite positioning.

Referring now to FIGS. 9A-9D, typical fan speed control parameters are illustrated for cooling an engine of a skid-steer or similar machine. That is, the fan speed control parameters in FIGS. 9A-9D are commonly used to control the operation of systems similar to those illustrated in FIGS. 8A and 8B. The fan speed parameters of FIGS. 9A-9D are used to derive the highest cooling demand from various cooling various fluids, including engine coolant (FIG. 9A), charge air (FIG. 9B), hydraulic oil (FIG. 9C) or any another medium such as transmission oil.

Figure 9A:
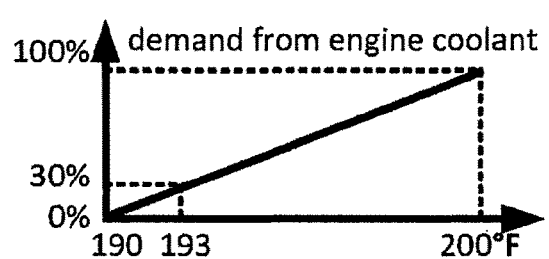
FIGS. 9A-9D are illustrations showing operating parameter charts for cooling demand in percentage vs. each cooling medium and used to derive the highest cooling demand.

In these examples, the engine coolant operating temperature range in FIG. 9A is from about 190° F. to about 200° F. At about 190° F., the engine thermostat opens and coolant enters into the radiator. At this time, the fan runs at minimum or 0 speed. At about 200° F., the fan runs the maximum required speed to cool the radiator at the maximum cooling capacity. If the measured coolant temperature is about 193° F. (determined according to analog input or from a message input to the fan controller by a vehicle bus commonly known in the art for providing communication and diagnostics among vehicle components, such as a J1939 bus), the cooling demand from the engine coolant is about 30%. The same logic applies to the charge air demand illustrated in FIG. 9B and the hydraulic oil demand illustrated in FIG. 9C. As shown in FIG. 9D, an SPN986 Engine percent request is a message from a vehicle bus (i.e., a J1939 bus) requesting the fan percent speed or cooling demand as determined by the engine's ECU. The fan controller selects the highest cooling demand to control the fan speed so that no medium will be overheated. In the case illustrated in FIG. 9D, the fan controller outputs current to have 80% of the maximum fan speed.

Figure 10A:
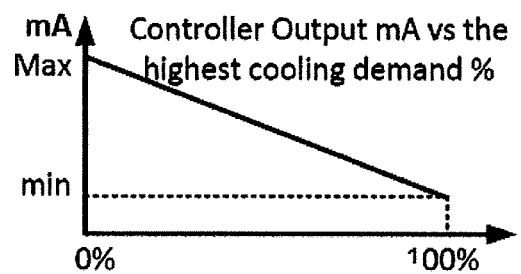
FIGS. 10A-10D are illustrations showing operating parameter charts for exemplary hydraulically-driven fan speed control parameters for engine cooling.
Figure 10B:
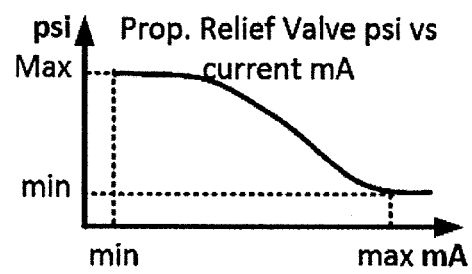
Figure 10C:
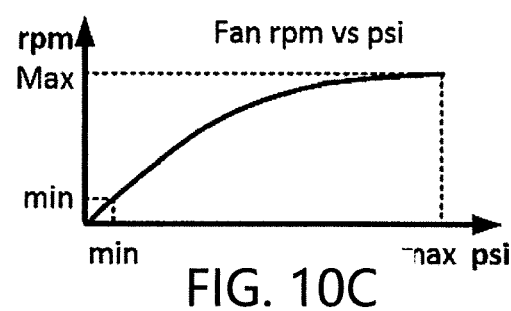
Figure 10D:
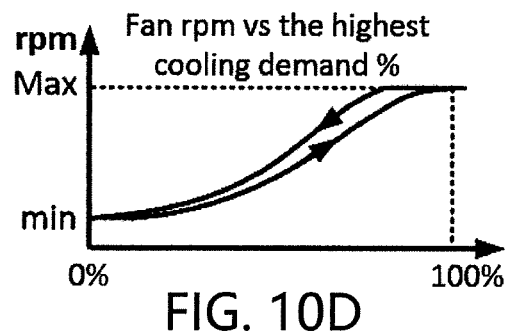

FIGS. 10A-10D illustrate typical hydraulic fan speed control parameters for systems similar to those illustrated in FIGS. 8A and 8B. In the parameters of FIGS. 10A-10D, the fan runs at minimum speed or 0 rpm when the highest cooling demand is 0%. The fan reaches the designed maximum speed when the highest cooling demand is 100%. FIG. 10B shows a chart illustrating an inverted proportional pressure (psi) relief valve curve vs. current output (mA). FIG. 10C shows a chart illustrating the physical law of a fan, where fan speed (rpm) is proportional to the pressure (psi) in the proportional relief valve. FIG. 10D shows a chart illustrating a performance curve of fan speed (rpm) vs. highest cooling demand percentage.

Figure 11A:
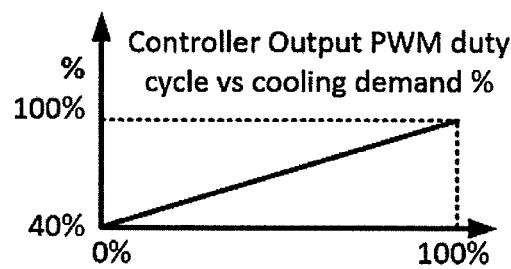
FIGS. 11A-11D are illustrations showing operating parameter charts for exemplary electrically-driven fan speed control parameters for engine cooling.
Figure 11B:
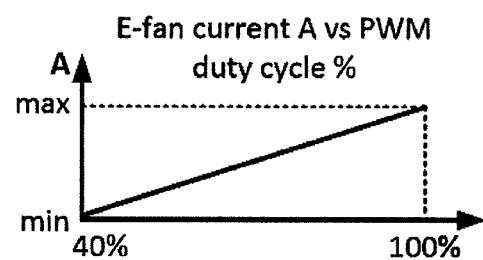
Figure 11C:
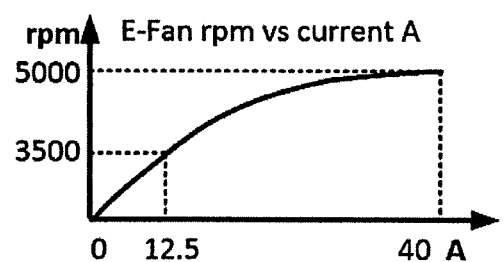
Figure 11D:
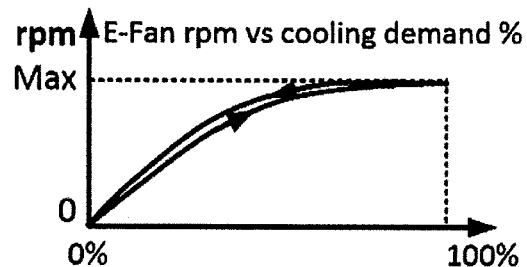

FIGS. 11A-11D illustrate typical e-fan speed control parameters for systems similar to those illustrated in FIGS. 8A and 8B. In the parameters of FIGS. 11A-11D, the e-fan runs at minimum speed or 0 rpm when the highest cooling demand is 0%. The e-fan reaches the designed maximum speed when the highest cooling demand is 100%. FIG. 11B provides a chart illustrating the e-fan current consumption (A) vs. the PWM duty cycle percentage. FIG. 11C shows a chart illustrating the physical law of an e-fan, where e-fan speed (rpm) is proportional to the e-fan current consumption (A). FIG. 11D shows a chart illustrating the performance curve of e-fan speed (rpm) vs. the highest cooling demand percentage.

Figure 12:
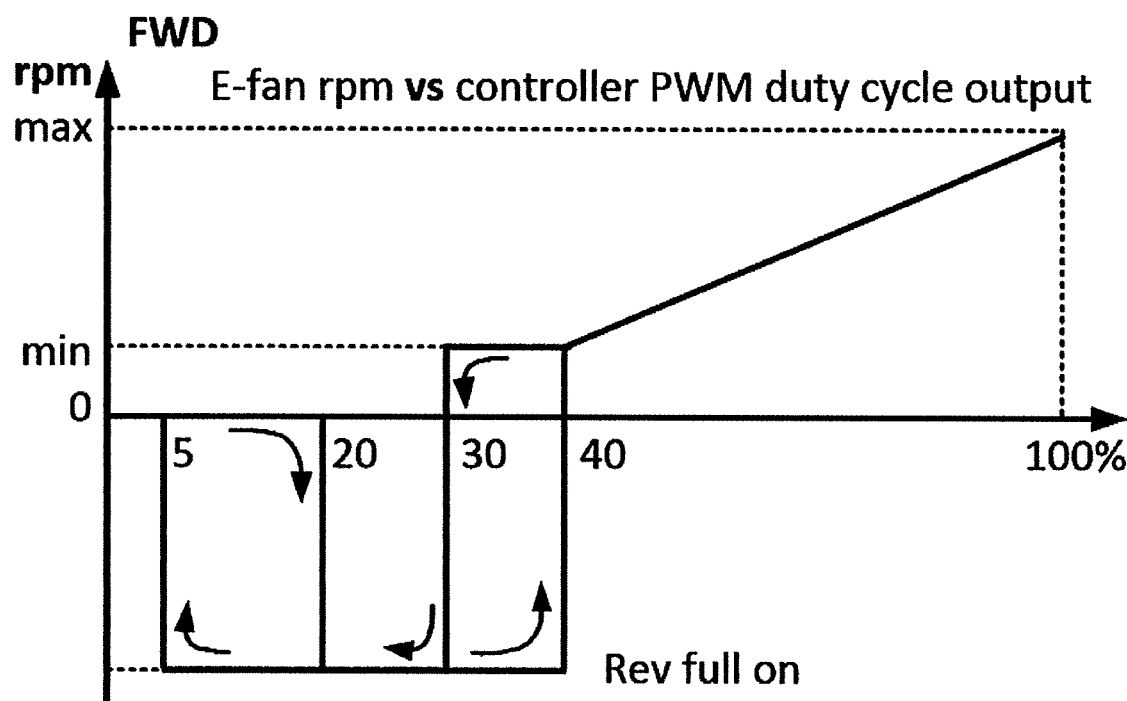
FIG. 12 is an illustration showing an operating parameter chart of exemplary e-fan speed vs. PWM duty cycle in full range.

FIG. 12 is a chart illustrating a typical e-fan speed vs. PWM duty cycle as a percentage in full range. The speed of the e-fan in forward direction is proportional to the PWM duty cycle from 40% to 100%. Below 40% is the full speed of the e-fan in reverse direction. Different e-fan manufacturers have different PWM duty cycle for full reverse speed. The chart illustrated in FIG. 12 is identical to the chart illustrated in FIG. 4.

Figure 9B:
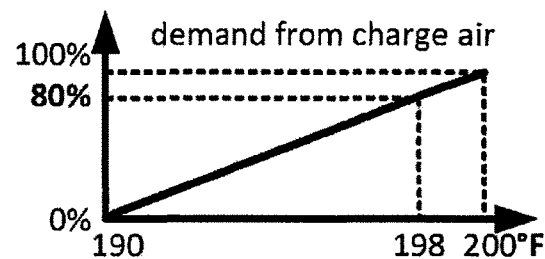
Figure 9C:
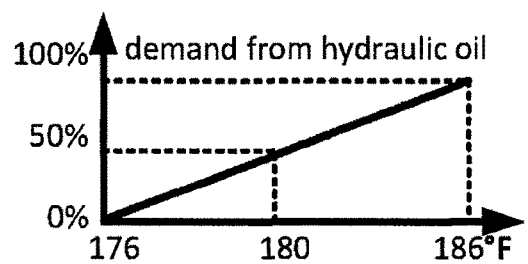
Figure 9D:
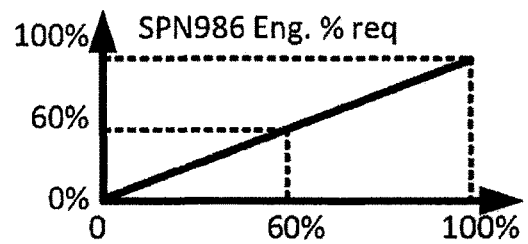

With reference now back to FIGS. 9A-9D, it should be appreciated that, in many cases, the charge air demand as illustrated in FIG. 9B is far higher than engine coolant demand illustrated in FIG. 9A, with charge air cooling being about 20% of the total cooling capacity. As such, a common complaint for hydraulic fan drive systems is that they do not save on fuel or energy. For example, given a hydraulic fan drive system having about 50 HP and used to drive a fan to cool both charge air and engine coolant, the engine coolant would demand 80%×30% of the 50 HP available, or 12 HP. The charge air would demand 80%×20% of the 50 HP available, or 8 HP. In other words, 20 HP total is demanded for cooling both charge air an engine coolant, while 80% of the 50 HP available, or 40 HP, is consumed. A common solution to this problem is through the use of a separate charge air cooler with e-fan(s) and a hydraulic fan for the engine radiator, unless the cooling demands from each medium are similar.

Figure 13:
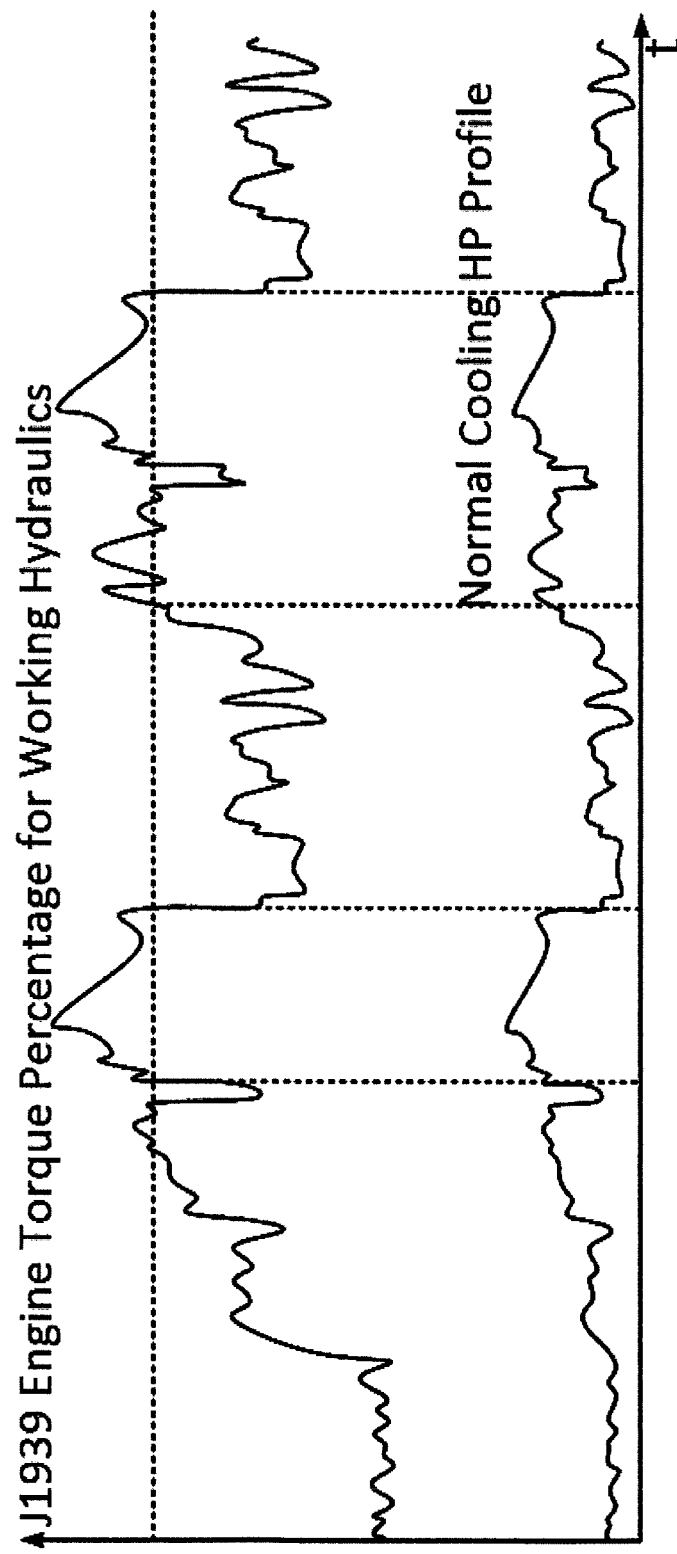
FIG. 13 is an illustration showing an operating parameter chart of exemplary working hydraulics torque demand from an engine and a typical cooling horsepower profile.

FIG. 13 illustrates a typical torque demand profile demanded by working hydraulics in an engine and a profile of horsepower (HP) required for cooling when known hydraulic fan speed control parameters are used in systems similar to those illustrated in FIGS. 8A and 8B. The engine torque percentage output is the sum of the torque required from working hydraulics, cooling and other accessories in the system. The more torque the engine outputs, the more heat the engine generates, thus the more HP is required to meet engine cooling demands. Therefore, FIG. 13 illustrates that the horsepower required to perform cooling takes away from the total available horsepower that could be used for performing actual work.

In view of the known fan speed control parameters as discussed above and which are commonly used to control the operation of systems similar to those illustrated in FIGS. 8A and 8B, it would be desirable provide a new control system that maintains the cooling medium at low operating temperature. The control means 126 described above can be used to implement the exemplary algorithm in accordance with the present disclosure.

Figure 14:
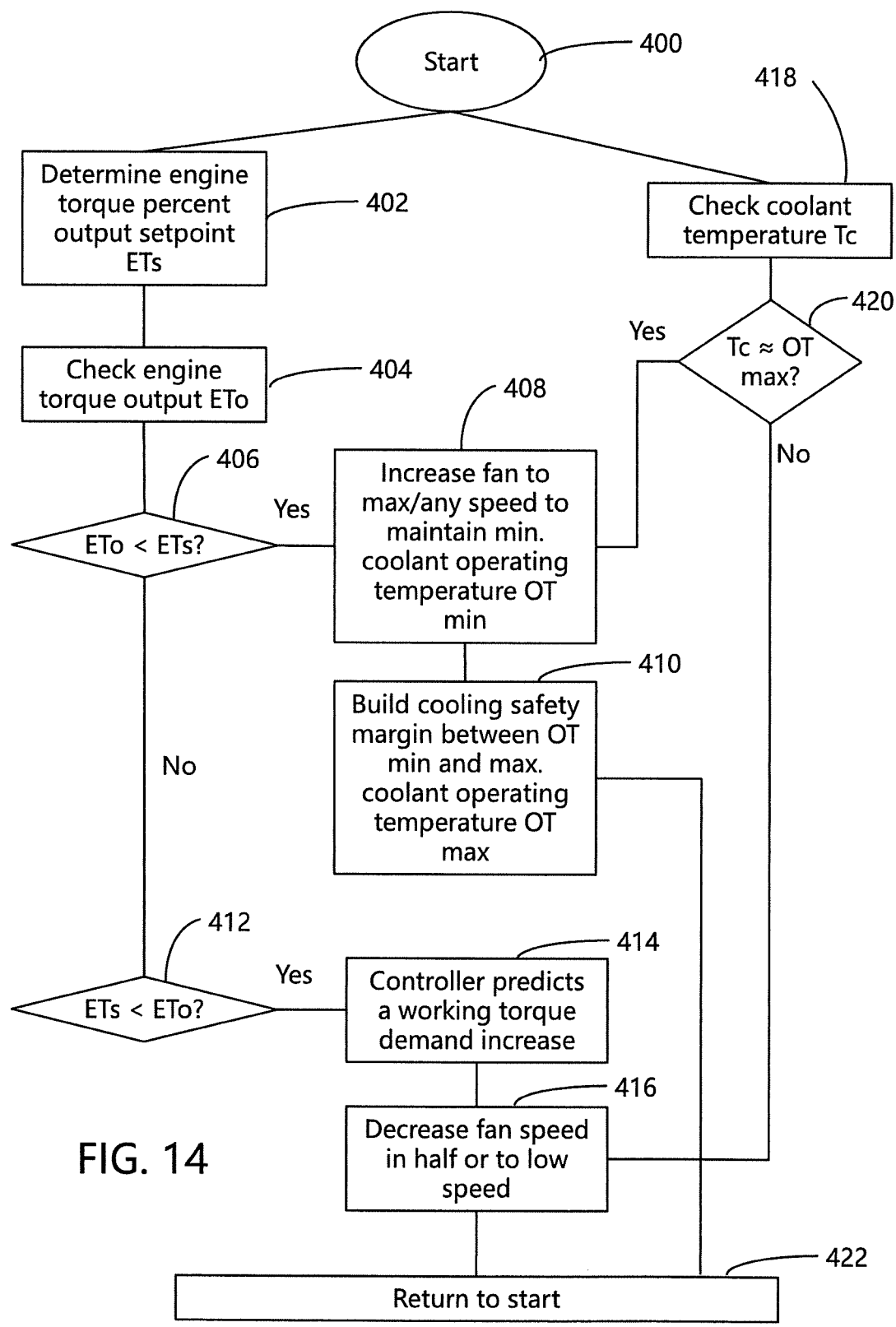
FIG. 14 is an illustration showing a flowchart of an algorithm adapted to control a drive system in accordance with another aspect of the present disclosure.

In another embodiment of the present disclosure, an exemplary control fan algorithm can be used to control fan drive systems, such as those illustrated in FIGS. 1 and 8A-8B, which may be specially adapted for machinery such as a skid-steer or skid-steer loader. The present exemplary algorithm is shown in the flow chart of FIG. 14. The algorithm starts at 400, and the controller determines the engine torque percent output setpoint ETs at 402. Next, at 404, the controller checks the actual engine torque output ETo. At 406, the controller determines whether actual engine torque output ETo is less than the engine torque percent output setpoint ETs. If yes, the algorithm moves on the 408 where the fan speed is increase to a maximum or any speed adapted to maintain a minimum coolant operating temperature OT min. Next, at 410, the controller then builds a cooling safety margin between the minimum coolant operating temperature OT min and the maximum coolant operating temperature OT max. If the response at 408 is no, the controller then checks whether the engine torque percent output setpoint ETs is less than the actual engine torque output ETo at 412. If yes, the controller moves on to 414 and predicts a working torque demand increase. Then, at 416, the controller decreases the fan speed in half or to a low speed.

In addition, at the start 400 of the algorithm, the controller checks the temperature Tc of the cooling media at 418. At 420, the controller checks whether the temperature Tc of the cooling media is similar to the maximum coolant operating temperature OT max. If yes, the algorithm moves to 408 and the controller increases fan speed to a maximum or any speed adapted to maintain a minimum coolant operating temperature OT min. If no, the algorithm moves to 416 and the controller decreases fan speed in half or to a low speed. After both 410 and 416, the algorithm returns to start at 422.

Such a control algorithm, as described above, is adapted to predict an increase in engine torque demand over a setpoint and adjust the fan speed accordingly. Fan speed can be based on a temperature setpoint that can be any temperature within an operating range that is commonly set by an original equipment manager or OEM. The engine torque percentage output setpoint can be any point set by the OEM. For example, the setpoint can be selected as the minimum operating temperature which has the biggest cooling safety margin.

Figure 15:
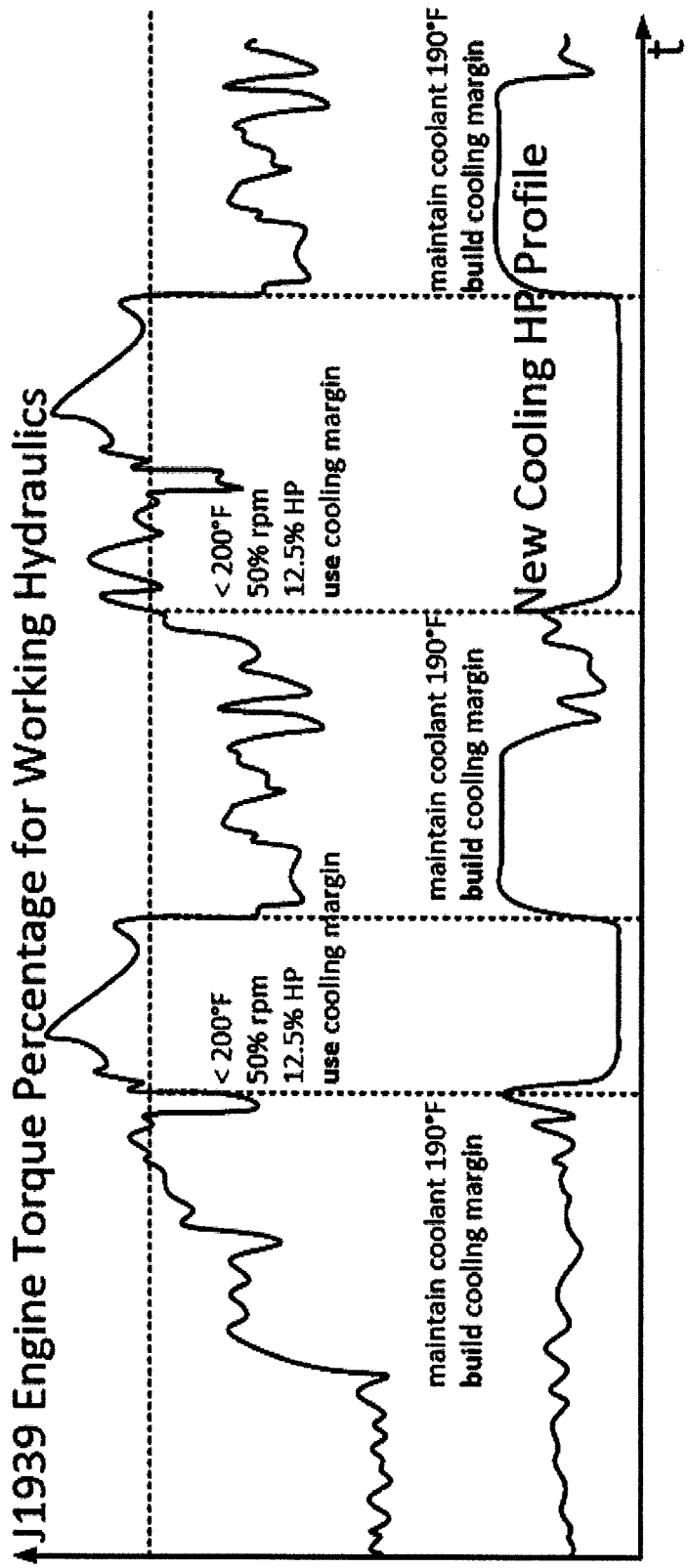
FIG. 15 is an illustration showing an operating parameter chart of exemplary working hydraulics torque demand from an engine and a cooling HP profile in accordance with the present disclosure.

FIG. 15 illustrates a typical torque demand profile demanded by working hydraulics in an engine and a profile of horsepower (HP) required for cooling when the presently disclosed hydraulic fan speed control parameters are used in systems similar to those illustrated in FIGS. 8A and 8B. When the engine torque output is below a setpoint (e.g., 70%, which is usually determined by the OEM), the fan runs at any speed to maintain the lowest or minimum coolant operating temperature (e.g., about 190° F.) and builds a cooling safety margin (e.g., from about 190° F. to about 200° F.). When the engine torque output increases above this setpoint, a controller predicts a working torque demand increase, ramps down fan speed to half (or any low speed), and spares a percentage (e.g., about 87.5%) of the HP required for cooling the working hydraulics while using the cooling safety margin (e.g., from about 190° F. to about 200° F.). The fan speed ramps up to full speed whenever: (a) the coolant temperature reaches/approaches about 200° F. to avoid engine overheat; and/or (b) the engine torque output drops below the setpoint to lower the coolant temperature to the minimum operating temperature (e.g., about 190° F.) and build the cooling safety margin for the next usage. The cycle then continues.

In another embodiment of the present disclosure, an exemplary control fan algorithm can be used to control fan drive systems, such as those illustrated in FIGS. 1 and 8A-8B, which may be specially adapted for machinery such as a skid-steer or skid-steer loader. The present exemplary algorithm is shown in the flow chart of FIG. 16. The algorithm starts at 500, and the controller determines whether the machine is fully accelerating forward at 502. If yes, at 504, the controller predicts a working torque demand increase. Next, the controller decreases or maintains fan speed in half or to a low speed at 506. If at 502 the response is no, then at 508 the controller runs the fan at its maximum speed or any speed adapted to maintain a minimum coolant operating temperature, OT min. Next, at 510, the controller builds a cooling safety margin between the minimum coolant operating temperature OT min and the maximum coolant operating temperature OT max. In addition, at the start 500 of the algorithm, the controller checks the temperature Tc of the cooling media at 512. At 514, the controller checks whether the temperature Tc of the cooling media is similar to the maximum coolant operating temperature OT max. If yes, the algorithm moves to 508 and the controller increases fan speed to a maximum or any speed adapted to maintain a minimum coolant operating temperature OT min. If no, the algorithm moves to 506 and the controller decreases fan speed in half or to a low speed. After both 510 and 506, the algorithm returns to start at 516.

Figure 17:
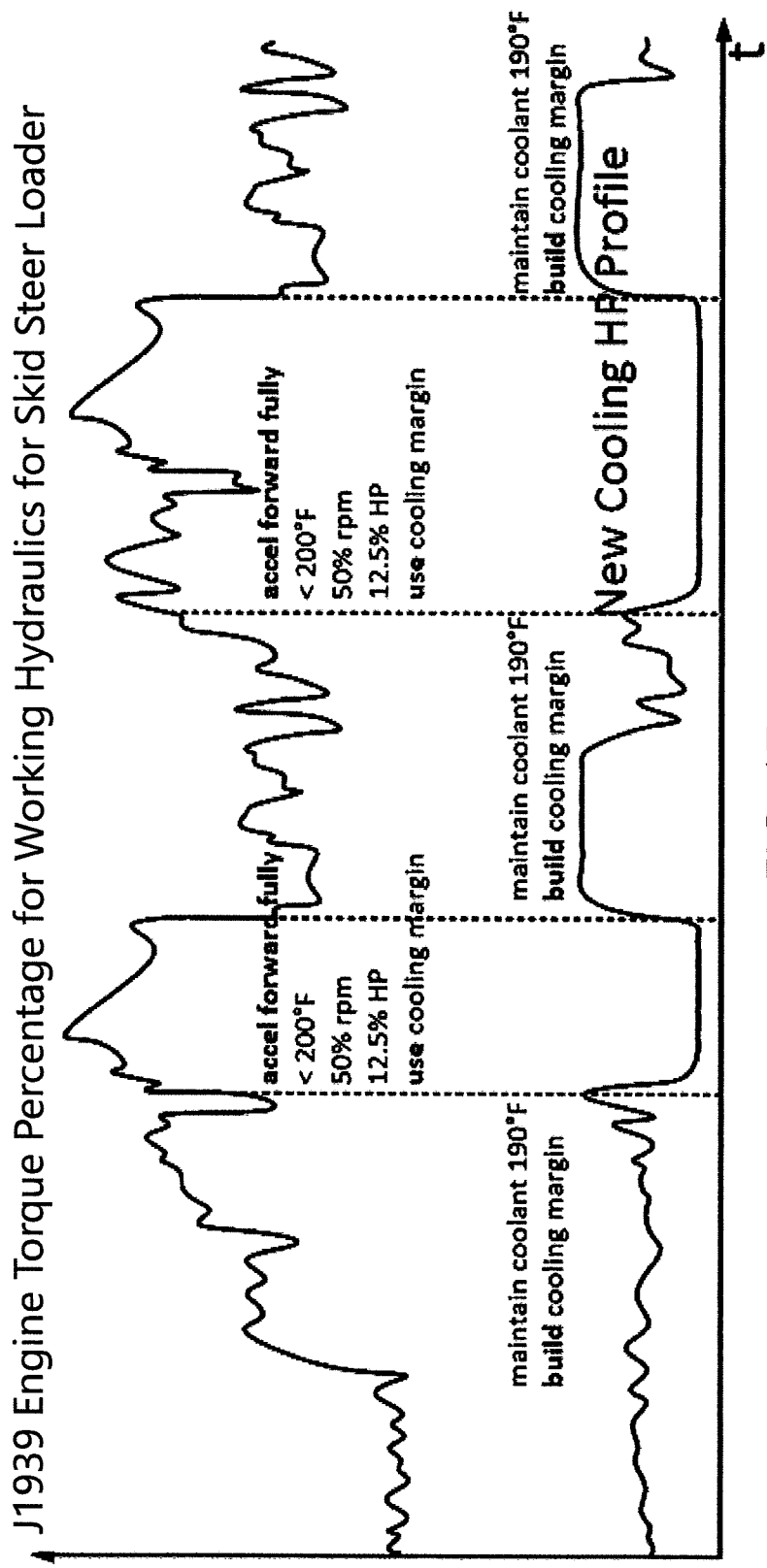
FIG. 17 is an illustration showing an operating parameter chart of exemplary working hydraulics torque demand from an engine on a skid-steer loader and a cooling HP profile in accordance with the present disclosure.

FIG. 17 illustrates a typical torque demand profile demanded by working hydraulics in an skid-steer or similar machine engine and a profile of horsepower (HP) required for cooling when the presently disclosed hydraulic fan speed control parameters are used in skid-steer or similar machine systems similar to those illustrated in FIGS. 8A and 8B. When the machine is not fully accelerating in a forward direction, the fan runs at any speed to maintain the lowest coolant operating temperature (e.g., about 190° F.) and builds a cooling safety margin (e.g., from about 190° F. to about 200° F.). When the machine is fully accelerating in a forward direction, the controller predicts a working torque demand increase, ramps fan speed in half (or any suitable low speed), and spares a percentage (e.g., about 87.5%) of the HP required while using the cooling safety margin (e.g., from about 190° F. to about 200° F.). The fan speed ramps up to full speed whenever the coolant temperature reaches/approaches about 200° F. to avoid engine overheat, or whenever the machine is not accelerating fully in the forward direction to build the cooling safety margin for the next usages. The cycle then continues.

Figure 16:
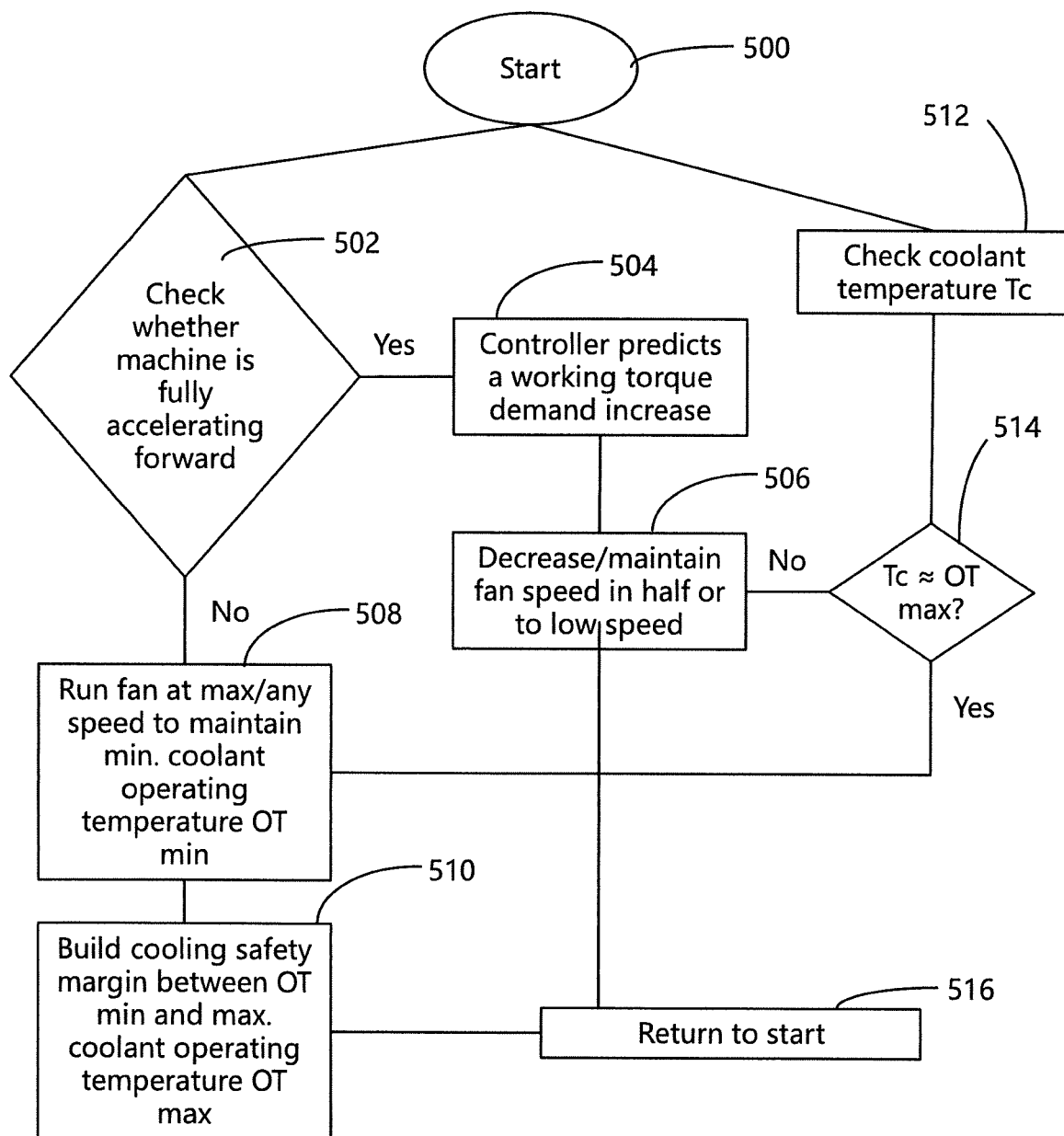
FIG. 16 is an illustration showing a flowchart of an algorithm adapted to control a drive system in accordance with still another aspect of the present disclosure.

Accordingly, in the exemplary control algorithms described herein and illustrated in at least FIGS. 15 and 16 of the present disclosure, the fan is configured to run at half speed (or any low speed) when the working hydraulics in a steer-skid or similar machine demand more torque. As a result, a percentage (e.g., about 87.5%) of the cooling HP is spared for the working hydraulics. FIGS. 8A and 8B illustrate exemplary steer-skid or similar machine fan systems in which the presently disclosed control algorithms can be used.

The specific action on any machine to predict an engine torque demand increase and predict fan speed ramp down to spare HP for cooling the working hydraulics non-limiting and can be achieved by any means desired without departing from the scope of the present disclosure. In any event, because hydraulic fan drive systems behave similar to hydraulic flywheels, the cooling safety margin can be stored as energy and used when needed. In addition, any specific temperature for the operating temperature range for engine coolant and other mediums to build/use the cooling margin is non-limiting.

Furthermore, it should be appreciated that control of the motor-driven fan can be performed by any suitable method, such as by use of a microcontroller known in the art. In some embodiments, a controller can be configured to control a proportional relief valve to modulate both the speed and the direction of the motor-driven fan. The controller can receive feedback from one or more sensors and use the feedback to predict or sense working torque increase from the engine. Such feedback information can include throttle position, acceleration data, slope sensor, actual engine torque output, engine torque percentage output, operator presence, etc.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

The invention claimed is:

1. A control system for controlling fan speed for use in engine cooling comprising:
 a fan drive system that is configured to implement an algorithm to a) control said fan speed to facilitate in maintaining a cooling medium at a set temperature and to build a cooling safety margin from the set temperature to an upper operating temperature limit for the cooling medium in response to an engine output torque percentage that is below an output torque percentage setpoint, said cooling safety margin is adapted to spare a percentage of horsepower required for working from a percentage of horsepower required for cooling said cooling medium in response to said controller predicting an engine torque demand increase, and b) predict an engine torque demand increase, wherein the predicted engine torque demand increase is based on the engine output torque percentage that is above the output torque percentage setpoint; and,
 a controller adapted to predict said engine torque demand increase.

2. The control system of claim 1, wherein the percentage of horsepower required for working and spared from the percentage of horsepower required for cooling is about 80%.

3. The control system of claim 1, wherein the engine torque demand increase is determined from a skid-steer loader machine.

4. The control system of claim 1, wherein the fan drive system includes a hydraulic fan drive system, an electric fan drive system and/or a variable viscous clutch fan drive system.

5. The control system of claim 1, wherein the fan drive system is hydraulic and includes a gear pump system, an open-circuit piston pump system, a closed-loop hydrostatic system, and combinations thereof.

6. The control system of claim 1, wherein the fan drive system is hydraulic and includes a single- or bi-directional fan.

7. The control system of claim 1, wherein the controller adapted to predict the engine torque demand increase includes a microcontroller.

8. A method for cooling an engine by use of a control system as defined in claim 1.

* * * * *